Jan. 13, 1942.                C. W. MOTT                2,269,982
                        AGRICULTURAL IMPLEMENT
                      Filed Feb. 23, 1940          3 Sheets-Sheet 3
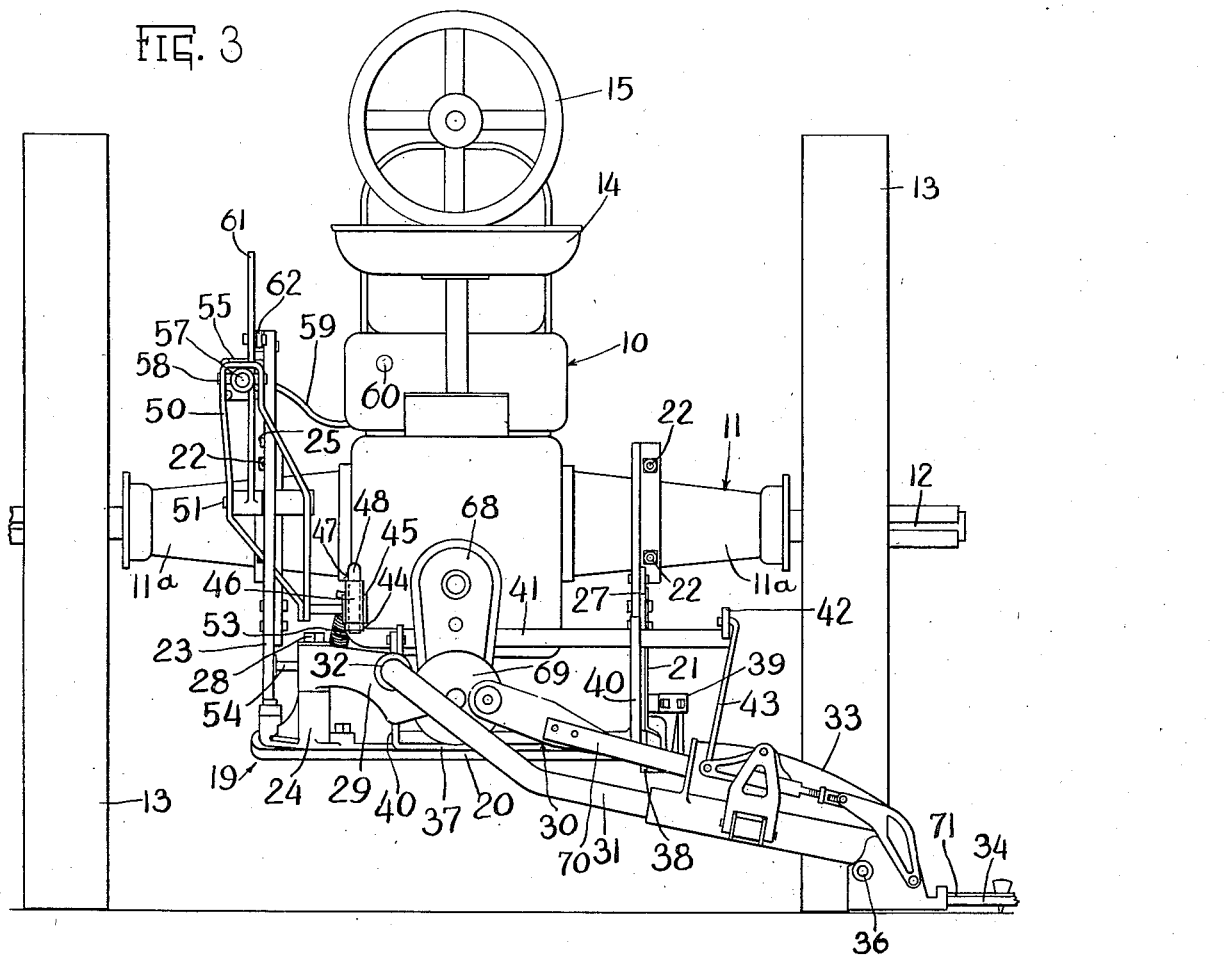
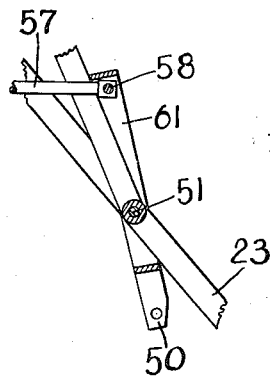
INVENTOR
C.W. MOTT
BY Paul O. Pippel
         ATT'Y.

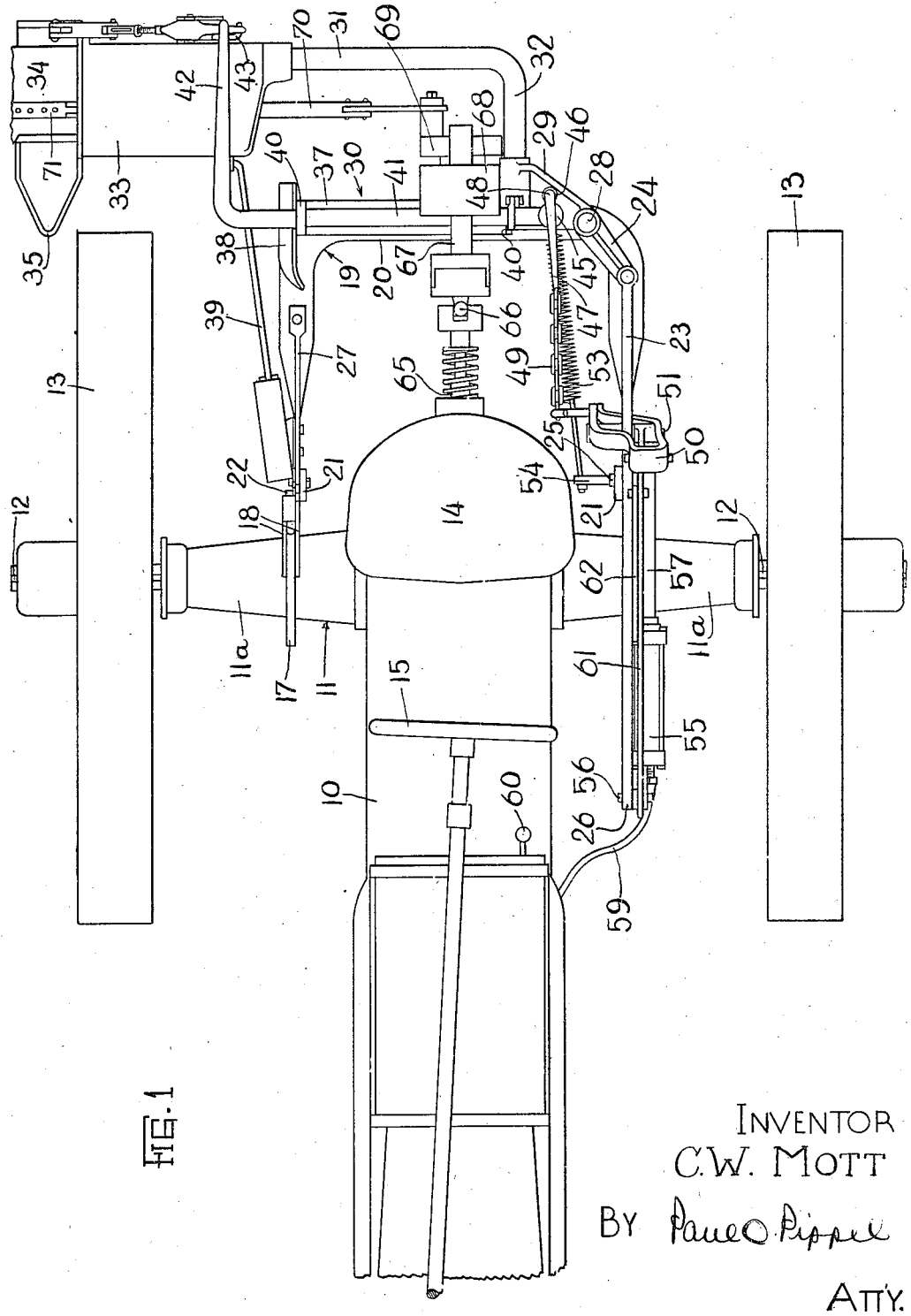

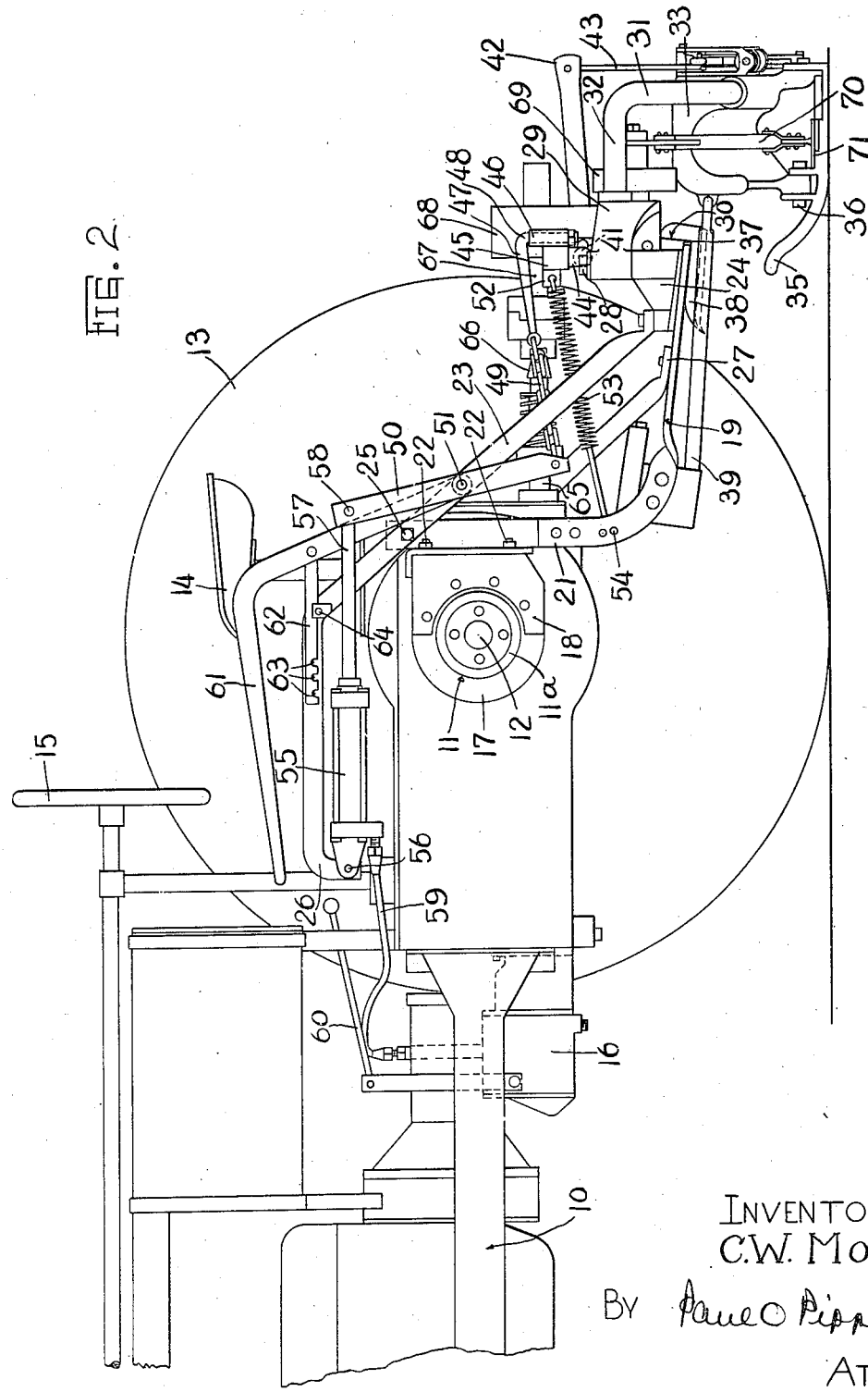

Patented Jan. 13, 1942

2,269,982

UNITED STATES PATENT OFFICE 2,269,982

AGRICULTURAL IMPLEMENT

Carl W. Mott, La Grange, Ill., assignor to International Harvester Company, a corporation of New Jersey Application February 23, 1940, Serial No. 320,461

12 Claims. (Cl. 56—25)

This invention relates to an agricultural implement, and more particularly to improved power lift means for a tractor attached implement.

The invention contemplates and has for its principal object improvements in power lift means of the fluid-expansible type as applied to an agricultural implement such as a tractor mounted mower.

An important object is to provide such lifting means in connection with an implement consisting of a unit construction detachably connected to a tractor.

Another important object is the provision of an implement frame structure providing means for supporting the power lift means wholly on said frame and independently of the tractor.

Another object is to provide means on the frame for supporting the power lift means in close proximity to a power supply means on the tractor.

Another object is to provide a mower construction of the releasable cutter-bar type and to provide for such mower lifting means having lifting connections including a connection arranged to remain in operative position even when the cutter-bar is released for rearward swinging movement.

Another object is to provide manually operable means associated with the lifting means for regulating the operation thereof and for locking a vertically movable implement part in raised or lowered position.

Briefly, and specifically, these and other important objects are achieved in one preferred form of the invention, wherein the improved lifting means is utilized in connection with an agricultural implement of the tractor-mower type. The tractor includes a rear axle structure on which is detachably carried a unitary frame supporting a mower including a laterally extending cutter-bar adapted to swing rearwardly about a vertical axis when released after striking an obstruction. The frame includes a forwardly extending supporting member having its forward end arranged in proximity to a fluid supply pump located substantially centrally of the forward and rearward ends of the tractor. This supporting member carries at said forward end a hydraulic lift means of the cylinder type, and the forward end of the cylinder is connected by a fluid supply means to the pump. A piston rod extends from the other end of the cylinder and is connected to lifting connections for raising and lowering the cutter-bar. The lifting connections include a connection providing a pivot on a vertical axis in close proximity to the vertical axis about which the cutter-bar swings when released. The arrangement of the frame structure is such that it may be removed as a unit from the tractor, and for this purpose the hydraulic cylinder is carried wholly by the frame independently of the tractor except for the fluid connection.

A more complete understanding of the objects and features of the invention may be had from the following detailed description taken in conjunction with the accompanying sheet of drawings, in which:

Figure 1 is a plan view of the rear portion of a tractor showing a mower connected thereto;

Figure 2 is a side elevational view of the same;

Figure 3 is a rear view of the same; and,

Figure 4 is a detail view of the association of the lifting connection with a hand lever.

The tractor chosen for the purpose of illustration comprises generally a longitudinal main body 10 including a rear axle structure 11 carrying drive axles 12 on which are respectively carried drive wheels 13. The rear portion of the body 10 includes an operator's seat 14 ahead of which is located a steering wheel 15 associated in the usual manner with steerable front wheels, not shown. The body 10 includes transmission gearing, not shown, which serves to drive a power means in the form of a fluid supply pump 16. This pump and associated lifting mechanism forms the subject-matter of assignee's application, Serial No. 181,778, filed December 27, 1937, now Patent No. 2,213,401, granted September 3, 1940.

The rear axle structure 11 includes a pair of oppositely disposed, laterally extending axle housings 11a, each of which is provided with a circular mounting flange 17. Each flange includes a pair of spaced supporting plates 18 provided with alined vertical rear faces, to which is attached the forward, upwardly extending end of a leg of a U-shaped frame structure 19. This frame includes a horizontal portion 20, forwardly extending side portions, and vertically extending tractor-attached portions 21. These supporting portions are detachably connected by bolts 22 to the aforesaid plates 18.

As best shown in Figure 1, the frame 19 carries a supporting member 23 rigidly secured at its lower rearward end to the frame 19 through the medium of a pivot casting 24. The member 23 extends upwardly and forwardly from this point and is rigidly connected at 25 to an upward extension of the left-hand vertical supporting portion 21, of the frame 19. The member then extends longitudinally forwardly of the tractor and has a downwardly extending portion at its forward end, as at 26. This portion is arranged generally in proximity to the fluid supply means 16. The opposite side of the frame 19 is appropriately supported by a support member 27.

The pivot casting 24 is provided with a vertical pivot pin 28 on which is pivotally mounted a second casting 29 comprising part of a mower frame 30. This mower includes a laterally extending coupling bar 31 having a longitudinally and forwardly extending stubbleward end 32 mounted for movement about a horizontal axis in the pivot casting 29. The coupling bar carries at its grassward end a conventional yoke structure 33 on which is carried on a horizontal axis a laterally extending cutter-bar 34. This cutter-bar is provided at its stubbleward end with the usual shoe 35 pivotally connected by pivot pins 36 with the yoke structure 33 to provide the aforesaid horizontal pivot action.

The mower further includes a laterally extending frame member 37 spaced forwardly from the bar 31 and supported on the rear portion 20 of the frame 19, as best shown in Figure 3. This frame member 37 is provided with an upwardly extending portion connected at its inner end to the pivot casting 29 and forms part of the mower frame mounted for pivotal movement about the aforesaid pivot pin 28. The other end of the frame member 37 is associated with a guide member 38 which embraces the forwardly extending portion at the grassward side of the frame 19. A releasable means 39, conventional in construction, is connected between the yoke structure 33 and a forward portion of the frame 19. This releasable means provides for holding the cutter-bar 34 normally in operative position and is releasable to permit rearward swinging of the cutter-bar and mower frame about the aforesaid pivot pin 28 between the pivot castings 24 and 29. The mower construction just described is similar to that disclosed in the Hilblom Patent No. 2,052,294.

The mower frame member 37 is provided at its opposite ends with upstanding bracket portions 40, which journal a transversely extending rock-shaft 41 having at its grassward end a rearwardly extending arm 42 appropriately connected by lifting linkage 43 to the cutter-bar 34. This lifting arrangement is similar to that shown in the patent previously referred to. The inner or stubbleward end of the rock-shaft 41 includes an integral, upwardly extending crank arm portion 44 on which is rigidly carried a member 45 including a vertically extending socket portion 46. A forwardly extending arm 47 has a vertically extending rear portion 48 journaled in the socket portion 46. This connection provides a pivotal connection on a vertical axis, which, it will be noted, is in close proximity to the vertical pivot axis provided by the pivot pin 28. The forward end of the arm 47 is connected by a flexible connection in the form of a chain 49 to the lower end of a lever or arm 50 pivoted intermediate its ends at 51 on the supporting member 23 of the frame 19. The member 45 at the stubbleward end of the rock-shaft 41 includes an ear 52, to which the rearward end of a tension spring 53 is connected. The forward end of the spring is suitably connected at 54 to a portion of the frame structure 19.

As best shown in Figure 2, it will be noted that the upper end of the lever or arm 50 is substantially in horizontal alinement with the front end portion 26 of the brace member 23. A power lift means in the form of a hydraulic cylinder 55 is pivotally connected at 56 to the brace portion 26. The cylinder has extending from its rearward end a piston rod 57 which is pivotally connected at 58 to the upper end of the lever or arm 50. The forward end of the cylinder 55 includes a portion to which is connected a fluid supply means in the form of a conduit 59 connected to the fluid pump 16. A control member 60 is provided within easy reach of the operator's station or seat 14 for operating the pump and cylinder. This arrangement is clearly disclosed in the application previously referred to.

The pivot 51, on which the lever or arm 50 is carried by the brace 23, further pivotally carries an upwardly forwardly extending hand lever 61. This lever includes a forwardly extending, pivotally mounted bar 62 having at its forward end a plurality of notches 63. The brace member includes a stop or locking portion in the form of a stud 64. This stud is adapted to be engaged by the notches 63 in the bar 62, as will hereinafter appear.

The tractor transmission gearing drives, in the usual manner, a rearwardly extending power take-off shaft 65 appropriately connected by flexible connections 66 to a shaft 67 extending from a gear housing 68 on the mower frame. The gearing in its housing is suitably connected to an eccentric 69, which in turn drives a conventional pitman 70 for reciprocating a knife 71 carried by the cutter-bar 34. The drive connection just described is generally conventional and is clearly illustrated in the above mentioned patent.

In the operation of the implement, the cutter-bar is arranged in normal operative position and is connected in that position by the releasable means 39. The tractor and mower are then propelled over the ground in the usual manner. Hidden obstructions engaged by the cutter-bar 34 will cause the cutter-bar to be forced rearwardly, thus releasing the releasable means 39, whereupon the cutter-bar will swing rearwardly about the pivot pin 28. Because of the proximate disposition of the lifting connection 48, rearward swinging of the cutter-bar does not interfere with the arrangement of the lifting means. There is also some lost motion between the piston 57 and the cylinder 55, that accommodates unexpected movement of the lifting means during rearward swinging of the cutter-bar.

The flexible connection provided by the chain 49 permits free floating movement within rather wide limits of the mower frame 30 as the shoe 35 follows the contour of the ground.

When it is desired to raise the cutter-bar 34 in order to avoid a visible obstruction, or in order to raise the cutter-bar to transport position, the control member 60 is actuated to cause operation of the pump 16 for supplying fluid to the cylinder 55. The pressure created by the fluid moves the piston rod 57 rearwardly, thus pivoting the lever or arm 50 about its pivot 51 on the frame 23, and in turn drawing forwardly on the chain 49 which is connected to the arm 47. This movement rotates the rock-shaft 41 to raise the rock-shaft arm 42, which in turn raises the cutter-bar 34. The height to which the cutter-bar is adapted to be raised is appropriately controlled by means of the control member 60.

As previously mentioned, the implement structure includes a hand lever 61. As best shown in Figure 4, the hand lever is adapted to engage an upper portion of the lever 50. It will thus be seen that upward and rearward movement of the hand lever 61 will cause the lever 50 to be pivoted in the same manner that it is by the operation of the lifting cylinder 55. When the cutter-bar is raised by either the lifting lever 61 or the hydraulic means 55, any one of the notches 63 may be engaged with the stud 64 on the brace 23 to lock the cutter-bar in such raised position. It will be understood, of course, that the power lift means is operable independently of the operation of the hand lever 61. This will be apparent from an examination of Figure 4, wherein it is illustrated that the hand lever 61 engages the lever 50 only when the hand lever is moved upwardly and rearwardly. However, when the cutter-bar is raised by means of the lifting cylinder 55, the hand lever 61 is freely movable and this lever may be thus moved rearwardly until any one of the notches 63 in the bar 62 engages the stud 64. The spacing of the notches provides for disposing the cutter-bar at various heights in lifted position.

It will be noted from the foregoing description that the frame structure including the implement is arranged as a unitary structure which may be readily detached from its position on the tractor. The lifting cylinder 55 is supported wholly on the supporting frame through the medium of the connections 56 with the braces 23 and 58 between the piston rod 57 and arm or lever 50. When it is desirable to remove this unitary structure, the bolts 22 are disconnected and the fluid supply line 59 is disconnected from either the pump 16 or the cylinder 55. The entire implement frame structure may be separately stored while the tractor is utilized for other purposes.

Another important feature of the invention is the arrangement of the lifting means so that operation thereof causes movement along a substantially longitudinal path generally alined with or in proximity to the vertical pivot pin 28. As previously mentioned, this arrangement permits the maintaining of the connecting linkage for the lifting means in operative position even though the cutter-bar is swung rearwardly. This feature becomes important because that portion of the lift means including the cylinder 55, arm 50, and chain 49 remains in position as respects the tractor, while the remaining portion of the lift means swings with the mower frame 30.

Other features and objects of the invention will be apparent to those skilled in the art. It will be appreciated, of course, that these objects and features may be attained in one particular preferred embodiment of the invention as disclosed, and it will be understood that numerous modifications and alterations may be made in such construction without departing from the spirit and scope of the invention as defined in the appended claims.

What is claimed is:

1. In a mower attachment for a tractor, a mower connected to the tractor and including a cutter-bar mounted on a vertical pivot axis and normally extending laterally in operative position, releasable means normally holding the cutter-bar in operative position and releasable to permit rearward swinging thereof with respect to the tractor, said cutter-bar being mounted also for vertical movement from ground position to raised position, the combination with the mower of lift means for the cutter-bar associated with the tractor and having connection with the cutter-bar for raising and lowering said cutter-bar, said connection including a first member having a sleeve and a second member having a portion fitting the sleeve to provide a pivot on a vertical axis in close proximity to the aforesaid vertical axis.

2. In a mower attachment for a tractor in which the tractor includes power means, a mower connected to the tractor and including a cutter-bar mounted on a vertical pivot axis and normally extending laterally in operative position, releasable means normally holding the cutter-bar in operative position and releasable to permit rearward swinging thereof with respect to the tractor, said cutter-bar being mounted also for vertical movement from ground position to raised position, the combination with the mower of power lift means for the cutter-bar associated with the tractor and driven by the aforesaid power means and having connections with the cutter-bar for raising and lowering said cutter-bar, said connection including a pivot on a vertical axis in close proximity to the aforesaid vertical axis.

3. In a mower attachment for a tractor in which the tractor includes power means, a mower connected to the tractor and including a cutter-bar mounted on a vertical pivot axis and normally extending laterally in operative position, releasable means normally holding the cutter-bar in operative position and releasable to permit rearward swinging thereof with respect to the tractor, said cutter-bar being mounted also for vertical movement from ground position to raised position, the combination with the mower of power lift means for the cutter-bar associated with the tractor and driven by the aforesaid power means and having connection with the cutter-bar for raising and lowering said cutter-bar, said connection including a pivot on a vertical axis in close proximity to the aforesaid vertical axis, and means for locking the cutter-bar in raised position.

4. In a tractor mower attachment for a tractor in which the tractor includes a supporting frame, a mower frame carried on said supporting frame on a vertical axis and including a laterally extending cutter-bar mounted for movement from ground to raised position, releasable means normally holding the mower frame and cutter-bar in operative position and releasable to permit rearward swinging movement thereof about the aforesaid vertical axis, a laterally disposed rock-shaft carried by the mower frame and including at one end a lifting connection to the cutter-bar, said shaft having at its other end a portion formed with a socket on a vertical axis in proximity to the aforesaid vertical axis, and lift means carried by the supporting frame and including a connection to the rock-shaft having a member movably engaging the socket in the rock-shaft portion to provide a jointed connection in which the aforesaid member is movable with respect to the rock-shaft on a substantially vertical axis formed by the aforesaid socket.

5. In a tractor-mounted mower in which the tractor includes a body and a supporting frame, the combination with the frame of a brace member connected to the frame and to the tractor and having a portion extending longitudinally of the tractor body, a mower frame carried by the supporting frame and including a cutter-bar mounted for movement from ground to raised position, a hydraulic cylinder carried by the longitudinally extending portion of the brace and including a longitudinally extending piston rod, and a lifting connection between the piston rod and the cutter-bar for raising and lowering the cutter-bar.

6. In a tractor-mounted mower in which the tractor includes a body and a supporting frame, the combination with the frame of a brace member connected to the frame and to the tractor and having a portion extending longitudinally of the tractor body, a mower frame carried by the supporting frame and including a cutter-bar mounted for movement from ground to raised position, a hydraulic cylinder carried by the longitudinally extending portion of the brace and including a longitudinally extending piston rod, a member pivoted intermediate its ends on the brace, means connecting one end of said member and the piston rod, and means connecting the other end of the member and the cutter-bar for raising and lowering said cutter-bar.

7. In a tractor-mounted mower in which the tractor includes a body and a supporting frame at the rear of the tractor body, the combination with the frame of a brace member connected to the frame and to the tractor and having a portion extending forwardly toward the front of the tractor body, a mower frame carried by the supporting frame and including a cutter-bar mounted for movement from ground to raised position, a hydraulic cylinder carried by the forwardly extending portion of the brace and including a rearwardly extending piston rod, a member pivoted intermediate its ends on the brace, means connecting one end of said member and the piston rod, means connecting the other end of the member and the cutter-bar for raising and lowering said cutter-bar, and a hand lever pivoted on the brace and including releasable locking means for releasably locking said cutter-bar in raised position.

8. In a tractor-mounted mower in which the tractor includes a rear supporting frame, a mower pivotally carried on the frame on a vertical axis and including a laterally extending cutter-bar mounted for vertical movement from ground to raised position, releasable means normally holding the mower and cutter-bar in operative position and releasable to permit rearward swinging movement thereof about the aforesaid vertical axis with respect to the tractor and frame, the combination with the mower of lifting means for the cutter-bar comprising a hydraulic cylinder associated with the frame and disposed longitudinally thereof generally in longitudinal alinement with the aforesaid vertical pivot, a piston rod extending from the cylinder, and connecting means between the piston rod and the cutter-bar including a connection providing a pivot on a vertical axis in proximity to the aforesaid axis.

9. In a tractor-mounted mower in which the tractor includes a rear supporting frame, a mower pivotally carried on the frame on a vertical axis and including a laterally extending cutter-bar mounted for vertical movement from ground to raised position, releasable means normally holding the mower and cutter-bar in operative position and releasable to permit rearward swinging movement thereof about the aforesaid vertical axis with respect to the tractor, the combination with the mower of lifting means for the cutter-bar comprising a hydraulic power means associated with the tractor and including a member movable fore and aft generally longitudinally of the tractor, the path of movement thereof being generally in longitudinal alinement with the aforesaid pivot axis, and connecting means between said member and the cutter-bar including a pivotal connection on a vertical axis in proximity to the aforesaid axis.

10. In a tractor mounted implement in which the tractor includes a rear axle structure and a fluid pump arranged forwardly of said axle structure, a unitary implement-frame detachably carried by the axle structure and including a forwardly extending supporting member having its forward end disposed in the vicinity of the fluid pump, said frame further including a part mounted for movement from ground position to raised position, a hydraulic lift means carried solely by the frame and having one end connected to the forward end of the aforesaid supporting member, fluid supply means between the pump and the lift means, and lifting connections between the lift means and the aforesaid part.

11. In a tractor mounted implement wherein the tractor includes a body having a centrally disposed fluid pump, a detachable implement-frame carried at one end of the tractor and including a part mounted for movement from ground to raised position, said frame further including a support extending within proximity to the pump, and a fluid lift means carried by the support and including fluid supply means connected to the pump, and lifting connections carried by the frame and connected between the lift means and the aforesaid part.

12. In a tractor-mounted implement wherein the tractor includes a rear axle structure and a power means disposed forwardly of the axle, a draw-bar structure detachably carried by the axle structure at the rear thereof and including an agricultural implement mounted thereon for movement from ground to raised position, a support carried by the draw-bar and extending forwardly of the axle structure and having a portion in proximity to the power means, lifting connections on the draw-bar structure for raising and lowering the implement, said connections including a member movably carried by the support, and power lift means pivotally connected to the aforesaid forward portion of the support and pivotally connected to the member and including operating connections to the aforesaid power means.

CARL W. MOTT.